US012578711B2

(12) United States Patent (10) Patent No.: US 12,578,711 B2

Weckbacher et al. (45) Date of Patent: Mar. 17, 2026

(54) METHOD FOR MONITORING A PRODUCTION PROCESS AND CORRESPONDING TECHNICAL ISSUES

(71) Applicant: Sanofi, Paris (FR)

(72) Inventors: Christian Weckbacher, Frankfurt am Main (DE); Florian Knicker, Frankfurt am Main (DE); Patric Ralph Stracke, Frankfurt am Main (DE); Christian Reuss, Frankfurt am Main (DE)

(73) Assignee: SANOFI, Paris (FR)

( * ) Notice: Subject to any disclaimer, the term of this patent is extended or adjusted under 35 U.S.C. 154(b) by 387 days.

(21) Appl. No.: 18/014,216

(22) PCT Filed: Jul. 7, 2021

(86) PCT No.: PCT/EP2021/068875

§ 371 (c)(1),
(2) Date: Jan. 3, 2023

(87) PCT Pub. No.: WO2022/008611

PCT Pub. Date: Jan. 13, 2022

(65) Prior Publication Data

US 2023/0259106 A1 Aug. 17, 2023

(30) Foreign Application Priority Data

Jul. 8, 2020 (EP) ..................................... 20315342

(51) Int. Cl.
G05B 19/418 (2006.01)

(52) U.S. Cl.
CPC . G05B 19/41875 (2013.01); G05B 19/41885 (2013.01)

(58) Field of Classification Search
None
See application file for complete search history.

(56) References Cited

U.S. PATENT DOCUMENTS 6,421,467 B1 * 7/2002 Mitra ................ G06F 18/23211
382/240
6,473,703 B1 * 10/2002 Kurtzberg ........ G05B 19/41865
700/109

(Continued)

FOREIGN PATENT DOCUMENTS

EP 0508386 10/1992
JP H05157499 A 6/1993

(Continued)

OTHER PUBLICATIONS

International Preliminary Report on Patentability in International Appln. No. PCT/EP2021/068875, mailed on Jan. 19, 2023, 9 pages.

(Continued)

*Primary Examiner* — Jason Lin
(74) *Attorney, Agent, or Firm* — Bond, Schoeneck & King, PLLC

(57) ABSTRACT

Disclosed is a method for monitoring a production process using limit values for a technical parameter of units produced by the production process or for a technical parameter of the production process. The values of the technical parameter of units produced by a production process or of a technical parameter of a production process are distributed according to an underlying distribution. The distribution is characterized by an asymmetric probability density function (700) or by an asymmetric cumulative distribution function (CDF). The method comprises: comparing at least one value of the technical parameter with an interval that is asymmetric with regard to a characteristic value of the distribution, and monitoring the production process based on the result of the comparison.

16 Claims, 5 Drawing Sheets

(56) References Cited

U.S. PATENT DOCUMENTS

| | | | | |
|---|---|---|---|---|
| 6,865,567 B1* | 3/2005 | Oommen | .......... | G06F 16/24542 |
| 6,892,163 B1* | 5/2005 | Herzog | .............. | G05B 23/0254 |
| | | | | 702/181 |
| 6,917,839 B2* | 7/2005 | Bickford | ............ | G05B 23/0275 |
| | | | | 706/14 |
| 7,050,956 B2* | 5/2006 | Uysal | .................. | G06F 11/3414 |
| | | | | 714/E11.193 |
| 7,324,924 B2* | 1/2008 | Barajas | .............. | G05B 19/4183 |
| | | | | 702/182 |
| 7,702,412 B2* | 4/2010 | Wang | ................... | G06Q 20/203 |
| | | | | 702/182 |
| 10,089,589 B2* | 10/2018 | Doms | .............. | G06Q 10/06393 |
| 10,171,314 B2* | 1/2019 | Raghavan | ........... | H04L 41/5029 |
| 2002/0032708 A1* | 3/2002 | Gupta | ...................... | G09B 7/02 |
| | | | | 707/E17.109 |
| 2003/0040954 A1* | 2/2003 | Zelek | ................. | G06Q 30/0201 |
| | | | | 705/7.29 |
| 2004/0204906 A1* | 10/2004 | Lambert | ................. | H04M 3/36 |
| | | | | 702/181 |
| 2006/0161460 A1* | 7/2006 | Smitherman | .......... | G16H 40/20 |
| | | | | 707/999.107 |

| | | | | |
|---|---|---|---|---|
| 2006/0179089 A1* | 8/2006 | Moriya | ................... | G06F 17/18 |
| | | | | 708/200 |
| 2007/0192060 A1 | 8/2007 | Yam et al. | | |
| 2014/0330402 A1* | 11/2014 | Keenan | ................. | G05B 13/04 |
| | | | | 700/31 |
| 2018/0015224 A1 | 1/2018 | Veilleux et al. | | |
| 2020/0338269 A1* | 10/2020 | Jazayeri | ................... | G01L 7/00 |

FOREIGN PATENT DOCUMENTS

| | | |
|---|---|---|
| JP | 2020506760 A | 3/2020 |
| WO | WO 2022/008611 | 1/2022 |

OTHER PUBLICATIONS

International Search Report and Written Opinion in International Appln. No. PCT/EP2021/068875, mailed on Oct. 21, 2021, 12 pages.

Notice of Reasons for Rejection, JP Patent Application No. 2023-501014, dated May 7, 2025, pp. 1-5 (with pp. 1-2 being a translation).

* cited by examiner

METHOD FOR MONITORING A PRODUCTION PROCESS AND CORRESPONDING TECHNICAL ISSUES

CROSS REFERENCE TO RELATED APPLICATIONS

The present application is the national stage entry of International Patent Application No. PCT/EP2021/068875, filed on Jul. 7, 2021, and claims priority to Application No. EP 20315342.4, filed on Jul. 8, 2020, the disclosures of which are incorporated herein by reference.

TECHNICAL FIELD

The disclosure relates to monitoring and controlling a production process, to generating a control chart, to a control chart, to a product or medical device product, to a computer program product and to a corresponding calculation device.

BACKGROUND

In medical injection devices, for instance single dose autoinjectors or multi dose injection pens, the following physical dimensions or parameters may have a non-normal distribution, especially an extreme value distribution: dose dial torque in pens, cap removal force, breakage forces in general, etc. In many cases it may not be possible to transform methods that are valid for normal distribution to other distributions due to for instance other restrictions and or other presumptions. Even if the methods that are valid for the normal distribution may be applied to other distributions this may have detrimental effects.

When dealing for instance with a quality characteristic that is a variable, it may be necessary to monitor both the mean value of the quality characteristic and its variability. Control of the process average or mean quality level may be done with a control chart for means, or the $\bar{x}$ control chart. Process variability may be monitored with either a control chart for the standard deviation, called the s control chart, or a control chart for the range, called an R control chart. The control chart may be named in short as chart in the following. The R chart may be used more widely. Usually, separate $\bar{x}$ and R charts are maintained for each quality characteristic of interest. The $\bar{x}$ and R (or s or variance) charts may be among the most important and useful on-line statistical process monitoring and control techniques. It may be important to maintain control over both the process mean and process variability.

The (control) chart may comprise an upper control limit UCL and a lower control limit LCL. An important difference between tolerance band limits and control limits may be that the former are used to determine whether individual manufactured components are acceptable, whereas the latter are used to control the manufacturing process. One of the risks of using tolerance limits, for instance a lower tolerance band limit LTBL or an upper tolerance band limit UTBL as a control method during ongoing production may be that if you find a part that lies near a tolerance limit, you may react too late. There may be a high probability that you have already been producing outside the tolerance for some time.

SUMMARY

The present disclosure provides a method for monitoring a production process. The method can allow the production process to be clearly monitored and/or visualized, the overall space of a control chart to be used as much as possible and/or the control limits for monitoring under consideration of the asymmetry of a distribution which characterizes a variable value of a production process to be set. In some cases for example, the control or warning limits can be set as "tight" as possible. A corresponding method for generating the control chart, a control chart, a corresponding product, a corresponding computer program product and a corresponding calculation device for performing the methods may also be provided.

According to some implementations, a method is provided for monitoring a production process using limit values for a technical parameter of units produced by the production process or for a technical parameter of the production process, wherein values of a technical parameter of units produced by a production process or of a technical parameter of a production process are distributed according to an underlying asymmetric distribution, wherein the method comprises:

comparing at least one value of the technical parameter with an interval that is asymmetric with regard to a characteristic value of the distribution, and monitoring the production process based on the result of the comparison.

Example embodiments of the disclosure include:

A method is disclosed for monitoring a production process using limit values for a technical parameter of units produced by the production process or for a technical parameter of the production process, wherein values of a technical (or physical) parameter of units produced by a production process or of a technical parameter of a production process are distributed according to an underlying distribution, wherein the distribution is preferably characterized by an asymmetric probability density function (PDF) or by an asymmetric cumulative distribution function (CDF), and wherein the method comprises:

comparing at least one value of the technical parameter with an interval that is asymmetric with regard to a characteristic value of the distribution, and monitoring the production process based on the result of the comparison.

The asymmetric interval enables an effective comparison which considers the asymmetry of the underlying distribution in an appropriate manner. The effective comparison results in an effective monitoring and in a tight control of the production process. Furthermore, it is for instance possible to adapt the estimated characteristic value based on the production process to an estimated characteristic value that is closer to a "real" but unknown characteristic value of the distribution.

The comparison may be made directly, e.g. by comparing a measured or detected value of the technical parameter with a value defining the beginning of the interval and/or with a value defining the end of the asymmetric interval. This may be done automatically by a computer. If the detected value is outside of the interval a message or signal may be generated automatically, for instance a warning signal/message which indicates that actions may be necessary in order to adjust the production process or a stop signal/message which indicates that the production process has to be stopped and corrected. Alternatively or additionally the comparison may compare the measured value or detected value of the technical parameter with the characteristic value of the distribution, for instance with a "center" value, e.g. with the mean value.

The comparison may be made more indirectly by setting the measured or detected value of the technical parameter in a relation to the interval, especially into a relation to the value defining the beginning of the interval and/or to the value defining the end of the asymmetric interval and/or to the characteristic value. This may be done for instance graphically, for instance within a control chart or in another appropriate way. A spatial relationship between the values may be visualized in order to give a person or a program the possibility to assess whether an upper limit of the interval is exceeded or not or whether the determined/measured value of the technical parameter has been fallen below a lower limit of the interval. The graphical presentation may allow a long term visualization of the process if several values of the technical parameter are considered over a longer time interval which comprises several samples which have been taken sequentially, for instance every hour, every day or at every other appropriate time period.

The technical parameter may be a static parameter of a unit, e.g. length, width, height, diameter (inner, outer), wall thickness, or a functional or dynamic parameter of a unit, e.g. an applied force, a force that is generated, an injection depth, etc. Thus, the technical parameter may be a physical parameter.

The technical parameter may be a process parameter, for instance a temperature, a pressure, for instance for an injection molding process.

The characteristic value of the distribution may be a location measure of the probability density function (PDF) of the distribution or of the cumulative distribution function (CDF) of the distribution. Appropriate location measures which describe a "center" of the distribution are mean, median, modus, etc. Thus, it is possible to create location measure control charts, e.g. mean value control charts.

Alternatively, the characteristic value of the distribution may be a location measure of a dispersion measure of the probability density function (PDF) of the distribution or of the cumulative distribution function (CDF) of the distribution. Appropriate location measure which describe a "center" of the dispersion measure of the distribution are mean, median, modus, etc. of the dispersion measure. A mean value or a median or a modus of the deviation or of the variance or of the range of the technical parameter may be used. Thus, it is possible to create a dispersion measure control chart, for instance a deviation control chart or a range control chart.

The unit may be a part, especially a single part of a device, an assembly of parts of a device or a complete device. The proposed method is especially relevant for the production of units of medical devices.

The production process may comprise the production of parts and/or an assembly process of a sub-assembly and/or a final assembly process of the complete device, comprising for instance the assembly of at least two sub-assemblies. A production process for a medical device may for instance comprise the final assembly of a front sub-assembly, of a rear sub-assembly and of syringe comprising a medicament or drug, see list of drugs that is mentioned below.

The distribution may be characterized by an asymmetric probability density function (PDF) or by an asymmetric cumulative distribution function (CDF). The method may comprise:

determining an upper value for an upper limit of the technical parameter, determining the characteristic value of the distribution, determining a lower value for a lower limit of the technical parameter, wherein a first difference of the upper value and of the center value is different from a second difference of the center value and the lower value, detecting a value of the technical parameter on units produced by the production process or from the production process, and comparing the detected value with at least one of, at least two of or all of the upper value, the lower value and the characteristic value, The lower value may define the beginning of the asymmetric interval. The upper value may define the end of the interval. Thus, monitoring and/or evaluation of the production process may be possible depending on how close the measured or detected values of the technical parameter are relative to the lower value or to the upper value or if the detected/measured value is below the lower value or above the upper value. Again, the asymmetry of the interval enables better visualizing and/or better decisions and/or better monitoring or control of the production process.

The second difference may be at least 10 percent or at least 20 percent or at least 30 percent greater than the first difference. Alternatively, the first difference may be at least 10 percent or at least 20 percent or at least 30 percent greater than the second difference. The deviation of the value of the first difference from the value of the second difference is an indication for the amount of asymmetry. However, other measures for asymmetry may be used as well, for instance the skewness that is mentioned below for the PDF of the distribution.

The comparison may be made directly by using the "greater than" and/or "less than" and/or "equal to" operator or function. Indirect comparing may be made by bringing the values of the upper limit and/or the lower limit and/or the characteristic value into a relation with regard to the measured or detected value of the technical parameter, for instance by visualizing positions for these values for instance within a coordinate system, preferably within a Cartesian coordinate system. The value of the technical parameter may be inserted between lines which indicate the upper limit and the lower limit as it is done in a control chart. The differences that are mentioned above are visualized as distances between corresponding lines.

The upper value or an upper value and/or the lower value or a lower value may be determined by:

S1) generating historic or simulated data for a technical parameter of technical parts produced by the production process or for a technical parameter of the production process, S2) based on the generated data identifying an asymmetric probability density function (PDF) or an asymmetric cumulative distribution function (CDF), S3a) determining or calculating at least one quantile using at least one of the probability density function (PDF) and the asymmetric cumulative distribution function (CDF) and determining at least one of the upper value and the lower value based on the at least one quantile, and/or S3b) using a location measure or a center of a dispersion measure of at least one of the asymmetric probability density function (PDF) and the asymmetric cumulative distribution function (CDF) as the characteristic value or calculating the characteristic value based on at least one of these functions.

The sequence of steps may be for instance: step S1 first, then step S2 and thereafter steps S3a and/or S3b. Step S3b may also be calculated before S3a or at the same time. Other sequences may be used as well. Steps S1 to S3b allow a simple but efficient calculation of the upper value and/or the lower value using the quantile which is used in process control for a long time for other purposes already.

A quantile of the order or level L is known from basic statistics. A portion L of all cases of the distribution is smaller than and/or equal to the quantile of level L. The level L may be specified as a percent value. In this application the letter Q is used to refer to a quantile Q(L). The 80 percent quantile may be written for instance as Q(80).

An asymmetric control chart may be generated by:

S3) determining at least one of the position of a line indicating an upper limit and the position of a line indicating a lower limit depending on the at least one quantile, S4) creating the control chart by placing an intermediate line, preferably a center line, in the control chart, wherein the intermediate line is placed at a center value (which may correspond to the characteristic value of the distribution as mentioned above) indicating a center of a location measure or a center of a dispersion measure of the asymmetric probability density function (PDF), and placing at least one of the line indicating the upper limit and the line indicating the lower limit in parallel to the intermediate line at the determined position or at the determined positions.

The method may further comprise:

detecting values or measuring values of samples of technical units which are produced by the production process or detecting values and measuring values of the production process and inserting the detected values into the control chart, and using the control chart and the inserted values for monitoring and/or controlling of the production process.

A sample may comprise only one detected value or measured value. Alternatively, a sample may comprise at least two, at least three values of the technical parameter, for instance for at least two, at least three units. A sample may contain less than 100 or less than 50 or less than 20 values of the technical parameter.

A statistical location measure may be determined for the values of a sample. The location measure and/or the dispersion measure may then be used as the value of the technical parameter which is compared with the asymmetric interval. The formulas or methods to determine statistical location measures are known. This value may then inserted in a mean value control chart.

Alternatively or additionally, a statistical dispersion measure may be determined for the items of one sample, for instance the deviation, the variance or the range. The dispersion measure may then be used as the value of the technical parameter which is compared with the asymmetric interval. The formulas or methods to determine statistical dispersion measures are known. This value may then inserted in a mean value control chart.

The control chart may comprise at least three lines that are parallel with regard to each other. The lines may define an area which indicates an acceptable process if the inserted or plotted points of the control chart are positioned within this area. The lines may be arranged horizontally as well as a time line. Alternatively, vertical arrangements may be used.

A control limit may define allowed values for the process parameter above and below the intermediate/center line. Additionally or alternatively a warning limit may define values that are still acceptable but give rise to worries or considerations about the future production process. An action should be taken, especially if the upper warning limit is exceeded and/or if points are below the lower warning limit too often in a predefined time interval. Usually the warning limits define a smaller area or a smaller corridor than the control limits.

Samples of parts may be taken from the production process according to a sample plan that specifies for instance sample size, i.e. the number of units, e.g. parts in a sample, and/or the sample time or sample time interval. The sampling plan may require the confirmation or the agreement of a regulatory institution, for instance the FDA (Food and Drug Administration) in US (United States), or of an official institution which is part of a CE (Conformité Européenne) process in EU (European Union) or of other authorities in other countries.

Symbols (points, crosses, circles, etc.) may be inserted or plotted into the control chart depending on the values of the measured or detected parameter within one sample. The inserted points may be connected by straight lines in the sequence according to insertion, i.e. the first value with the second value, the second value with the third value and so on. Alternatively, curves may be calculated which connect the inserted points in a more sophisticated way, for instance spline curves.

The advantages of the proposed method may be:

The control space on a control chart may be used completely or as much as possible because the asymmetry of a probability density function (PDF) and/or cumulative distribution function (CDF) which models the production process with regard to the technical parameter.

"tight" or tighter positioning of at least one of the control limits and/or warning limit may be possible because of the consideration of asymmetry of the probability density function (PDF) and/or of asymmetry of the cumulative distribution function (CDF) which model the production process with regard to the technical parameter, i.e. one side of function may be shorter than the other side with regard to an axis that marks the center of the function, e.g. the mean value.

Furthermore, the following technical effects may apply:

The control chart may be immediately usable for the monitoring/control of the production, The control chart may be easy to explain to regulatory institutions, The control chart may be easy to create using common statistical software, spreadsheet program (for instance EXCEL), electronic tabulator or pen and paper, The control chart may be more exactly, The adjustment of the production process may be more exactly, and No transformations to normal distribution may be necessary for non-normal distributions.

The control chart may be generated in electronic form, e.g. on a display, in a memory etc. or in paper form, e.g. printed out, or in another appropriate form.

The PDF and/or CDF may describe and/or model a statistical process for the simulation of the production process and/or may be regarded as a statistical process that is a model of the production process. Further, the PDF and/or CDF may describe and/or model the statistical distribution which describes the values of the technical parameter.

The production process may be an industrial production, e.g. a mass production, where methods of statistics may be applied. The mass production may be a production that produces, for instance more than one hundred thousand pieces per year, more than 1 million pieces per year, more than 10 million pieces a year or more than 100 million pieces a year. For instance, less than 10 billion or less than 1 billion (i.e. less than 1000 million) products a year may be produced. The production may be a production of medical products, e.g. technical medical products (devices) or pharmaceutical medical products. Products of other industries may be also used in the method, for instance automotive products, semiconductor products, chemical products, medicament, etc.

A lot or a batch may contain a predefined amount of parts that are transported through and that are processed in the production as a group of parts or products. The lot/batch may contain a number of items that is in the range of 10 to 1000000 parts. For technical medical products (devices) the number of items may be in the range of 100 to 100000 parts, for instance 10000 parts. Other industries may have other lot sizes, for instance between 10 to 100 semiconductor wafers in semiconductor industry. Machines that are used for the production, especially for the production of medical devices may be molding machines, preferably injection molding machines that produce plastic parts. The samples may be taken from the same lot or from different lots. The units of a sample may all be taken from the same lot.

The product or the produced unit may be part of a product or a complete product itself. A part of product may be a single part or a subassembly, for instance a front sub-assembly of a case of a medical device, e.g. of an autoinjector or of a multi dose pen, and/or a carrier for a container or comprising a container (e.g. cartridge or syringe) for a medicament and/or a rear sub-assembly comprising a rear case for an autoinjector or a multi dose pen. The rear sub-assembly may comprise a drive mechanism and/or a release mechanism.

The products may be medical products, especially medical devices or pharmaceutical products. The technical parameter may be a dial torque, a cap removal force, a cap placement force or a breakage force, preferably of an injection device that is used to inject a medicament. Examples for medicaments or drugs that may be injected are given below.

The health care sector or industry has a direct influence to the health and/or life of people. Therefore, it is important to enable the consideration and/or balancing of producer(s) risks and consumer risks also in cases where a technical parameter is not distributed according to a normal distribution but for instance according to an extreme value distribution. Regulatory authorities have to confirm to sampling plans and/or to limits that are used in a control chart. It may be for instance important, that a cap removal force is not greater than a specified value in order to enable also a weak person the removal of the cap from an injection device. The usage of the proposed asymmetric interval/control chart enables an appropriate and adequate balancing of the risks.

An autoinjector (AI) may be an injection device that is operated by patients or other persons for instance by only removing the cap and starting an injection. Thus, no does dial may be necessary and the injection may be an automatic injection. A spring member that generates the injection force may be loaded in the factory and not by a user of the autoinjector.

Contrary, a multi dose pen may be an injection device that is operated by the patient or by another person whereby the patient or the person has to perform more steps compared to the operation of an autoinjector. Thus the patient or the person (nurse, relative, etc.) may dial a dose before injection, the patient or other person may deliver a force for loading a spring for injection or for biasing a spring member that delivers injection force, a cap may be removed before injection, the cap may be placed on the pen again after use, i.e. after injection of the medicament. The pen injector may allow dose setting and may require that the user pushes a plunger manually. Alternatively, the driving energy may be stored during dose setting, for instance in a torsion spring.

In more detail, the calculating of the at least one quantile using the asymmetric probability density function (PDF) and/or the asymmetric cumulative distribution function (CDF) may comprise:

Alternative a)

a1) calculating analytically the asymmetric cumulative distribution function (CDF) by integrating the asymmetric probability density function (PDF), a2) calculating analytically the inverse function or the generalized inverse function of the asymmetric cumulative distribution function (CDF), and a3) calculating the quantile by determining the function value of the inverse function for a specified level of the quantile.

Thus, the quantile may be calculated using a formula. This allows very exact results and need less calculation efforts, for instance less computing time compared with other methods, e.g. according to alternative b).

Alternative b) may comprise:

b1) integrating the asymmetric probability density function numerically (PDF), b2) using at least one result of the numerical integration to determine the quantile depending on a level of the quantile.

Alternative b) may be used if alternative a) is not possible, for instance, because the CDF or the inverse of the CDF does not have a closed form.

The inverse of a function may be a function that "reverses" another function. If the strictly monotone function f applied to an input x gives a result of y, then applying its inverse function g to y gives the result x, and vice versa, i.e., $f(x)=y$ if and only if $g(y)=x$.

In case f is monotone but not strictly monotone the generalized inverse function g is uniquely defined by the Galois inequalities, i.e. $y \leq f(x)$ if and only if $g(y) \leq x$.

In an embodiment which is not claimed, a location measure control chart is or may be generated by using a mean value or a median or a modus of the technical parameter as the center value or as the characteristic value. The mean may be calculated as the sum of all values for the technical parameter in a sample divided by the size N of the sample.

Alternatively, a dispersion measure control chart is or may be generated by using a mean value or a median or a modus of the deviation or of the variance or of the range of the technical parameter as the center value or as the characteristic value. The deviation may be the positive square root of variance. The range may be defined as the maximum value of the technical parameter in a sample minus the minimum value of the technical parameter in the same sample.

Both types of control charts may be used in common for good and/or excellent control of the production process and for the production of units of high quality, i.e. one control chart for a location measure and one control chart for a dispersion measure.

The upper value may indicate an upper control value. The lower value may indicate a lower control value. There may be a first difference between the upper control value and the characteristic value, for instance the center value of a control chart. A second difference may be the difference between the characteristic value and the lower control value. The second difference is at least 10 percent or at least 20 percent or at least 30 percent longer than the first difference. Alternatively, the first difference may be at least 10 percent or at least 20 percent or at least 30 percent longer than the second difference. The lower control value or both control values may be different from the zero value.

The difference may correspond to a distance between corresponding lines in a control chart. The distance may be the minimum distance between the respective lines, e.g. straight lines. Thus, the distance may be measured perpendicular to the lines which are parallel with regard to each other.

The asymmetry may not be the result of a zero value but may be considered intentionally at a value that is different from the zero value. The asymmetry of the control chart may reflect the asymmetry of the probability density function (PDF) and/or the asymmetry of the cumulative distribution function (CDF) as mentioned above. The PDF is sometimes also referred to as probability distribution function.

The upper control value may correspond to an upper control limit UCL of a control chart. The lower control value may correspond to the lower control limit LCL of a control chart. The upper control limit UCL and/or the lower control limit LCL may refer to a location measure (e.g. mean, median, modus) as in a location measure control chart or they may refer to a dispersion measure (e.g. deviation, variance, range) as in a dispersion measure control chart. If the upper control value/limit is exceeded the production process may be stopped for the corresponding units. If the lower control value/limit is not reached, the production may also be stopped.

The control values/limits may be arranged within a range which is defined by specification values, for instance by an upper specification limit USL and/or by a lower specification limit UCL. The specification limits may be specified by the customer and/or by a regulatory institution.

Alternatively, the upper value may indicate an upper warning value. The lower value may indicate a lower warning value. A first warning difference maybe the difference between the upper warning value and the characteristic value, for instance the center value in a control chart. A second warning difference may be the difference between the characteristic value and the lower warning value. The second warning difference may be at least 10 percent or at least 20 percent or at least 30 percent longer than the first warning difference. Alternatively, the first warning difference may be at least 10 percent or at least 20 percent or at least 30 percent longer than the second warning difference. The lower warning value or both warning values may be different from the zero value.

The warning difference may correspond to a respective warning distance in a control chart. The respective warning distance may be the minimum distance between the respective lines, e.g. straight lines. Thus, the warning distance may be measured perpendicular to the lines which are parallel with regard to each other. Again, the asymmetry may not be the result of a zero value but may be considered intentionally at a value that is different from the zero value. The asymmetry of the control chart may reflect the asymmetry of the probability density function (PDF) and/or the asymmetry of the cumulative distribution function (CDF) as mentioned above. The PDF is sometimes also referred to as probability distribution function.

The upper warning value may correspond to an upper warning limit UWL in a control chart. The lower warning value may correspond to a lower warning limit LWL in a control chart. The upper warning limit UWL and/or the lower warning limit LWL may refer to a location measure (e.g. mean, median, modus) as in a location measure control chart or they may refer to a dispersion measure (e.g. deviation, variance, range) as in a dispersion measure control chart.

The warning values/limits may be located in a range which is defined by control values/limits. If the warning limits are reached, this may result in less restrictive action compared to reaching and/or exceeding a control value/limit. Thus, actions according to an out-of-control action plan OCAP may be taken if an upper warning value/limit is reached or exceeded or if the detected/measured value of the technical parameters has been fallen below a lower warning value/limit.

According to an embodiment that is not claimed yet, the production process may be a production process for the production of medical products, automotive products, semiconductor products, pharmaceutical products or chemical products, i.e. process with a "safety" component. The proposed method may be especially advantageous in industries with relevance for the health of the consumer.

The production process may be a production process for the production of medical devices, especially of drug delivery devices, of autoinjectors, of pen injectors, or of parts of medical devices or of assemblies that are parts of medical devices. The injector may be used for injection of drugs into patient, especially diabetes patients. A needle may be used for injection. However, a high pressure nozzle may be used for subcutaneous injection. A low pressure nozzle may be used for spraying, e.g. for nasal or oral spraying. High regulatory requirements may be fulfilled by the asymmetric control chart(s) and/or asymmetric interval(s) if used for medical devices. This may result in high reliability of the injectors and may avoid defects of devices or may reduce defects considerably. Therefore, health risks for the consumer may be reduced and/or other advantages as mentioned in this application may be reached.

The assembly may comprise a group of parts of a device, for instance a front case assembly may comprise a cartridge holder or a syringe holder, a cap, a front case, etc. A rear case assembly may comprise a driving mechanism and/or release mechanism and or a rear housing part. An assembly may already fulfill a final function of the device. Therefore, the technical parameter may be detected or measured on the assembly in order to detect errors as early as possible. Thereby, subsequent costs for faulty devices may be avoided or reduced considerably.

The technical parameter may be one of the following parameters of a drug delivery device: a) dose accuracy, b) dial torque, c) dispense force, d) cap attachment force, e) cap removal force, f) needle shield removal force, g) injection time, h) activation force, i) blocking distance of a needle cover, j) needle extension, k) expelled volume or l) assembly force. These parameters may have an underlying asymmetric PDF and/or CDF. Thus, the proposed method is most appropriate for these technical parameters.

In an embodiment which is not claimed yet, the asymmetric probability density function (PDF) or the cumulative distribution function (CDF) is or may be an asymmetric curve with regard to an axis, especially a geometrical mirror axis. The axis may extend through a central value, especially mean, median or modus of the asymmetric probability density function (PDF) or of the cumulative distribution function. The axis may be parallel to a y-axis of a coordinate system for plotting the probability density function or the cumulative distribution function. An area located left of the axis and below the curve of the PDF may be at least 10 percent greater or at least 20 percent greater or at least 30 percent greater than an area located right of the axis and below the curve of the PDF or vice versa.

The skewness of the PDF and CDF may be another measure for the asymmetry. The skewness is known from statistics and may be equal to or greater than 0.5, equal to or greater than 1 or equal to or greater than 2 for the PDF or CDF of the underlying distribution of the technical parameter. Thus, a "tail" on one side of the PDF or CDF may be much longer than on other side, e.g. if the same probability value is regarded as the starting point of the tail of the probability density function. The asymmetry of the PDF or CDF may be mapped directly to the asymmetry of the control chart. Thus, the control space that is available on the control chart may be used completely or as much as possible, e.g. unused "bands" or unused "stipes" may be avoided or reduced if compared with the case in which a symmetric interval/control chart is used for a technical parameter having an asymmetric PDF or CDF.

The asymmetric probability density function may be one of: the generalized extreme value distribution (Gumbel, Fréchet, Weibull), generalized gamma distribution (exponential, gamma, Weibull, log normal), smallest extreme value family (smallest extreme value distribution, negative Fréchet, (negative) Weibull), Gumbel distribution, Fréchet distribution, Weibull distribution, exponential distribution, gamma distribution, log-normal distribution, Rossi distribution and Rayleigh distribution etc.

The asymmetric interval or the asymmetric control chart may be used for at least one of the following purposes in order to control the production process:

On-line process-monitoring of the production process, for instance by inserting detected values or measured values of the technical parameter into the control chart or by comparing these values with the asymmetric interval, or Triggering actions of an out-of-control action plan for the production process, for instance if the comparison indicates or if inserted values of the parameter indicate that actions are necessary, or Estimating parameters of the production process, or Providing information that is useful for improving the units or of the production process, or Reducing or eliminating variability of the units and/or of the production process.

a) Monitoring may comprise the visualization of the value of the technical parameter over time, i.e. within different samples. Furthermore, monitoring may comprise obeying limits, for instance with regard to the asymmetric interval or with regard to limits of a control chart.

b) The out-of-control action plan (OCAP) may allow immediate action if errors are apparent from the control chart. The out-of-control action plan (OCAP) may for instance require to contact a process engineer, to adjust technical parameter of the process and/or to enter comments in log file if a deviation is apparent from the control chart.

c) An example for parameter estimation may refer to the following scenario. If it is assumed that the mean value of the inserted points, crosses, etc., is permanent or for a longer time above or below the center line this may indicate that another mean value should be used for a location measure (mean, median, modus) or for dispersion measure (deviation, variance range). The same applies to the upper value/limit and/or the lower value/ limit of the asymmetric interval and/or of the control chart.

d) It may be possible to compare several control charts for the same technical parameter, i.e. over a longer time period. For instance, the same statistical measure for the parameter may be used as a basis for the comparison. Alternatively, different statistical measures may be compared for the same technical parameter, e.g. a location measure and a dispersion measure. Alternatively and or additionally, control charts for different parameters may be compared.

e) The variability of units or of the production process may be indirectly reduced by reducing the variability of technical parameter of the production process. Alternatively, the variability of the production process may be more directly be reduced by using knowledge that is derivable from the comparison and/or control chart or from actions taken according to the OCAP and of their effects.

At least one of a value which indicates the beginning of the interval, a value which indicates the end of the interval and a value which is used as the characteristic value of the distribution may be adjusted depending on the monitoring of the production process. This adaptive control loop may improve the future production considerably.

A further aspect relates to a method for generating an asymmetric control chart for monitoring and/or controlling a production process, especially a control chart as used in the method(s) mentioned above. The method may comprise:

S1) generating historic or simulated data for a technical parameter of units produced by the production process or for a technical parameter of the production process, S2) based on the generated data identifying an asymmetric probability density function (PDF) or an asymmetric cumulative distribution function (CDF) which describes the production process, S3) determining or calculating at least one quantile using the asymmetric probability density function and/or the asymmetric cumulative distribution function and determining the position of a line indicating an upper limit and/or defining the position of a line indicating a lower limit depending on the at least one quantile, S4) creating the control chart by placing a center line in the control chart, wherein the center line is placed at a center value (which may correspond to the characteristic value of the distribution as mentioned above) indicating a center of a location measure or a center of a dispersion measure of the asymmetric probability density function (PDF), and placing at least one of the line indication the upper limit and the line indicating the lower limit in parallel to the center line at the determined position or at the determined positions.

The technical advantages that result from the usage of the proposed control chart have its basis in the control chart itself. Thus, the generated control chart enables these advantages and is therefore also based on a technical teaching. The same method steps may be used to determine the asymmetric interval which is mentioned above. In this case, "upper limit" has to be replaced by "upper value", "lower limit" has to be replaced by "lower value", etc. This is done in an aspect which is not claimed yet.

The asymmetric control chart that is generated by the method may comprise:

an upper line for an upper limit of a technical parameter, a lower line for a lower limit of the technical parameter, and an intermediate line, preferably a center line, which is located between the upper line and the lower line.

A first distance between the upper line and the intermediate line may be different from a second distance between the intermediate line and the lower line.

The center line may be placed at a center value indicating a center of a location measure or a center of a dispersion measure of the asymmetric probability density function. This means that the center line is not limited to the geometric center of the control limits and/or warning limits.

A next aspect relates to an asymmetric control chart for monitoring a production process, especially a control chart generated according the preceding aspect. The control chart may comprise:

an upper line for an upper limit of a technical parameter, a lower line for a lower limit of the technical parameter, and an intermediate line, preferably a center line (as mentioned above), which is located between the upper line and the lower line.

A first distance between the upper line and the intermediate line may be different from a second distance between the intermediate line and the lower line.

The control chart may comprise at least one upper line (UCL, UWL) as mentioned above. Furthermore, the control chart may comprise at least on a lower line (LCL, LWL) as is also mentioned above. Moreover, the intermediate line, e.g. center line may be placed closer to at least one of the upper lines if compared with the distance to the corresponding lower line.

The control chart may be generated in electronic form, e.g. on a display, in a memory etc. or in paper form, e.g. printed out, or in another appropriate form.

The technical effects that are mentioned above apply also to the asymmetric control chart. An aspect which is not claimed yet relates to an asymmetric interval. In this case, "upper line for an upper limit" has to be replaced by "upper value", "lower line for a lower limit" has to be replaced by "lower value", etc.

A further aspect is directed to a product or to a medical device product that is produced in a production process which uses a method mentioned above. It may be possible to trace the usage of the proposed control charts in industries that are obliged to certify and/or to document the complete production or essential parts of the production. Thus, it may be required to store the control charts for a longer time after the production, for instance as long as the products that have been produced using the control chart are in the market, i.e. not used by the consumer yet.

Another aspect relates to a computer program product comprising computer readable program code with instructions which, when loaded and/or executed on a processor, cause the processor to carry out at least one of, an arbitrarily selected plurality of, or all of the method steps according to any one of the methods mentioned above. The technical advantages and/or effects that are valid for the asymmetric interval and or for the asymmetric control chart do also apply to the computer program product that is used to generate or to use the interval/control chart. The computer program product may be stored on a memory stick, on a compact disk, in an electronic memory, e.g. RAM (random access memory) or it may be in the form of signals that are transmitted via a data transmission network, for instance via the internet or via a local area network LAN.

An embodiment that is not claimed yet refers to a calculation device, comprising:

a processor configured to execute instructions, a memory that is configured to store the instructions and to store data that is used or generated during the execution of the instructions, a data input device, a data output device, and a computer program product as mentioned above.

The input device may receive or may be used to input determined values, for instance using a data file or using a keyboard. The output device may send or may be used to output a result of the comparison, for instance on a monitor, e.g. a display, or into an output file. Thus, the features, advantages and technical effects that are valid for the proposed methods and its embodiments may also be valid for the calculation device.

Moreover, same reference numerals refer to same technical features if not stated otherwise. As far as "may" is used in this application it means the possibility of doing so as well as the actual technical implementation. The present concepts of the present disclosure will be described with respect to preferred embodiments below in a more specific context namely the production process of drug delivery devices. The disclosed concepts may also be applied, however, to other situations and/or arrangements as well, for instance to the production process of cars, planes, semiconductor products or of chemical products.

The foregoing has outlined rather broadly the features and technical advantages of embodiments of the present disclosure. Additional features and advantages of embodiments of the present disclosure will be described hereinafter, e.g. of the subject-matter of dependent claims. It should be appreciated by those skilled in the art that the conception and specific embodiments disclosed may be readily utilized as a basis for modifying or designing other structures or processes for realizing concepts which have the same or similar purposes as the concepts specifically discussed herein. It should also be recognized by those skilled in the art that equivalent constructions do not depart from the spirit and scope of the disclosure, such as defined in the appended claims.

BRIEF DESCRIPTION OF THE FIGURES

For a more complete understanding of the presently disclosed concepts and the advantages thereof, reference is now made to the following description in conjunction with the accompanying drawings. The drawings are not drawn to scale. In the drawings the following is shown in.

DETAILED DESCRIPTION

Figure 1:
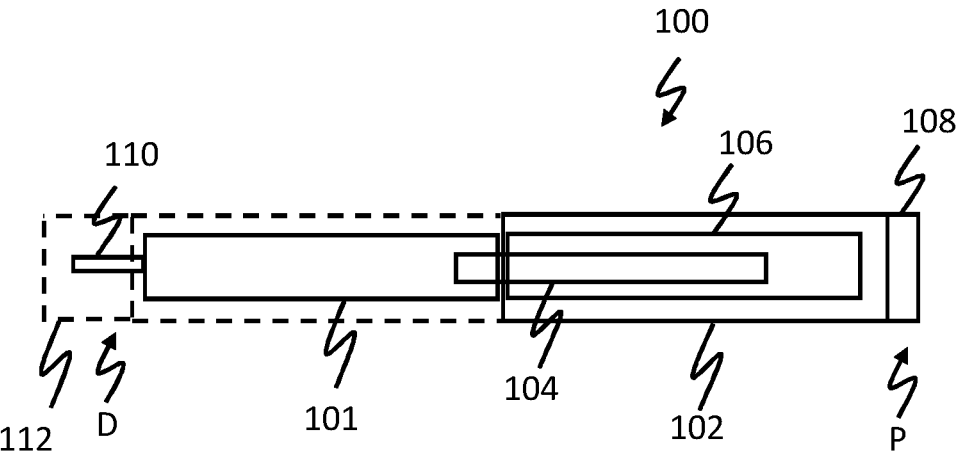
FIG. 1 a drug delivery device.

FIG. 1 illustrates a drug delivery device 100 that may comprise a container retaining member 101. The container retaining member 101 may comprise a drug container as is explained in more detail below. The drug container may be a syringe, for instance made of glass and comprising a neck portion a barrel portion and a flange.

The drug delivery device 100 may comprise a main housing part 102 that encloses or surrounds the container retaining member 101 completely or partially and that comprises further parts of the drug delivery device 100. Alternatively, the main housing part 102 may be connected to the container retaining member 101 but may not surround it and even may not surround a part of the container retaining member 101, see dashed line in FIG. 1. Main housing part 102 may be split in a front housing part and a rear housing part. The front housing part may comprise a front sub-assembly as mentioned in the introductory part. The rear housing part may comprise a rear sub-assembly as also mentioned in the introductory part.

Within the main housing part 102 the following may be arranged:

A piston rod 104 that is adapted to move a piston of a container that is within container retaining member 101

An optional driving mechanism 106 for the piston rod 104. The driving mechanism 106 may comprise an energy storing element, for instance a spring, that is loaded manually or automatically, for instance during assembling of drug delivery device 100 or before each use, For instance at an proximal end P, an actuating element 108 that is used for the initiation of a movement of the piston rod 104 into the container retaining member 101, whereby the driving mechanism 106 may be used or whereby the piston rod is driven manually. Alternatively, an autoinjector device may be used that is actuated by an axial movement of a movable needle shield. Optionally, actuation element 108 or another element may also be used for dose dialing.

A cap 112 that may be attached to main housing part 102 or to another part of drug delivery device 100. Cap 112 may be an outer cap that may include a smaller inner cap that protects a needle 110 directly which is mounted on a distal end D of the drug delivery device 100.

Drug delivery device 100 may be a single use or a multiple use device. Actuating element 108 may be part of a trigger mechanism that is triggered from the distal end, for instance if drug delivery device 100 is an auto injecting device.

The drug may be dispensed out of the container through the needle 110 or through a nozzle that is connectable and/or connected to the distal end D of drug delivery device 100. Needle 110 may be changed before each use.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., from about 18° C. to 28° C. or e.g. about 20° C.), or refrigerated temperatures (e.g., from about 2° C. to about 8° C. or from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N-(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N-(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C, CM-3, GLP-1 Eligen, ORMD-0901, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, TT-401, BHM-034. MOD-6030, CAM-2036, DA-15864, ARI-2651, ARI-2255, Exenatide-XTEN and Glucagon-Xten.

An examples of an oligonucleotide is, for example: mipomersen sodium (Kynamro®), a cholesterol-reducing antisense therapeutic for the treatment of familial hypercholesterolemia.

Examples of DPP4 inhibitors are Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present disclosure include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present disclosure, which encompass such modifications and any and all equivalents thereof.

Figure 2:
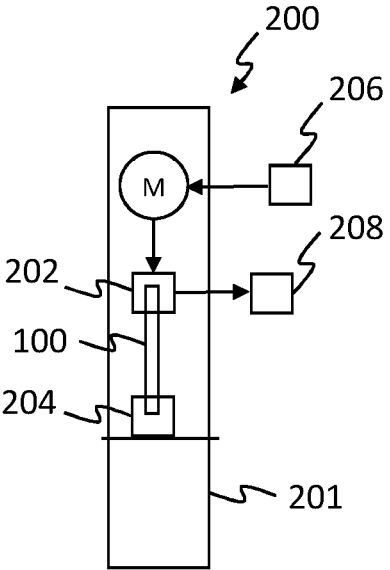
FIG. 2 a test setup device for drug delivery devices.

FIG. 2 illustrates a test setup device 200 for testing at least one parameter of drug delivery devices, especially of drug delivery devices of the same type as drug delivery device 100.

Test setup device 200 may comprise:

A mounting arrangement 201 that allows vertical movement of some parts of test setup device 200, A motor M that generates a force and/or a torque for the movement of the movable parts, An upper clamp device 202 that may clamp one end of the device under test, for instance the distal end or the proximal P end of a device under test, A lower clamp device 204 that may clamp the other end of the device under test, A control device 206 that may control the movement that is generated by motor M, and A measurement reporting device 208 that is connected for instance to a force sensor.

Other parts of test setup device 200 are not shown, for instance an optional scale or display, an electrical power supply unit, etc.

Upper clamp device 202 and/or lower clamping device 204 may be movable relative to each other in order to generate or exert a force that is applied onto the device under test (DUT).

Test setup device 200 may be used to measure forces and/or torques that are relevant for drug delivery devices 100 or for other devices. In the following, it is assumed that test setup device 200 is used to measure the dispensing force of an autoinjector or of a manually driven pen-injector. Alternatively, for instance the force of cap attachment and/or of cap removal of cap 112 or another parameter may be measured that is not distributed according to a normal distribution but for instance according to an extreme value distribution, e.g. a Gumbel distribution. The drug delivery devices 100 under test may be of a device type that is produced by the applicant of this application. However, other device types or devices of other producers may also be tested. Other test setup devices may be used as well.

A completely assembled drug delivery device 100 or a front sub-assembly may be clamped into test setup device 200. Cap 112 may be held by lower clamp device 204. The proximal end P of drug delivery device 100 may be held by upper clamp device 202. However, it is also possible that cap 112 is hold in upper clamp device 202 and that the proximal end of drug delivery device 100 is held in lower clamp device 204.

Figure 3:
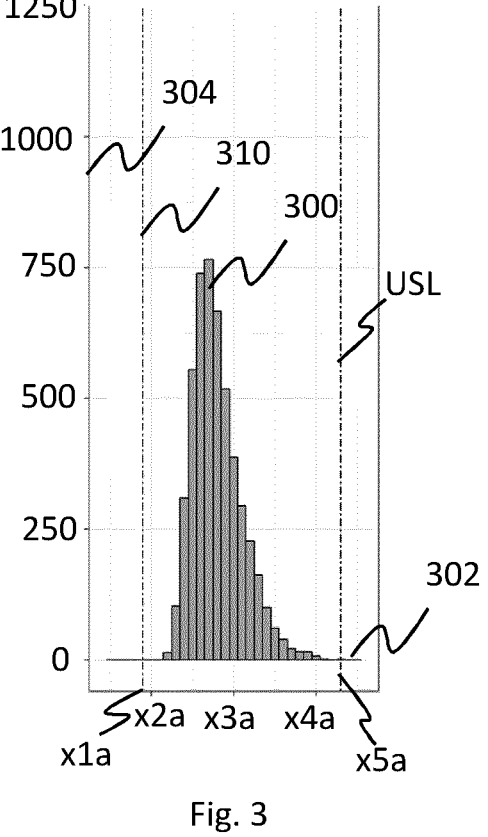
FIG. 3 a histogram for the force for dispensing a dose from an autoinjector or from a pen injector, FIG. 4 a histogram for the torque for dialing a dose using a pen injector, FIG. 5 an asymmetric $\bar{x}$ (mean) control chart and an asymmetric s control chart, FIG. 6 a symmetric distribution and symmetric quantile values (not part of disclosure only for comparison), FIG. 7 an asymmetric distribution and asymmetric quantile values, FIG. 8 a method for generating an asymmetric control chart, and FIG. 9 a calculation device that may perform the method steps.

FIG. 3 illustrates a histogram 300 for the maximum force MAXF for dispensing a dose from an autoinjector or from a pen injector. The force is supplied by a driving spring for an autoinjector. In case of a pen injector, the force is supplied by the patient or a user. The maximum force MAXF may be the relevant technical parameter mentioned in the first part of this document and mentioned in the claims as well. Histogram 300 is shown within a Cartesian coordinate system comprising a horizontal x-axis 302 and a vertical y-axis 304. The x-axis 302 represents maximum force MAXF data values, especially within the range of x2a N (Newton) to x5a N that is defined as an upper specification limit USL. The y-axis 304 represents the count, i.e. the number of devices falling within one of the classes of the histogram 300, for instance within the range of 0 to 1250. A line 310 at x1a visualizes a physical limit. The reason for the physical limit may be the use of a counterweight resulting in a minimum weight force which can't be undercut even by an ideal (e.g. frictionless) device mechanic.

In the example that is shown in FIG. 3, 22 classes of same width are defined. The first two classes are empty, i.e. no tested device felt within these classes. The number of tested devices in the following classes raises steeply on the left side of histogram 300 up to about 750 devices in class 8. On the right side of histogram 300 the number of tested devices falls moderately if compared with the raising side from about 700 devices to zero devices within the last class of histogram 300.

Thus, histogram 300 has an asymmetry with regard to an axis (not shown) forming the center of the class with the most tested devices. Histogram 300 corresponds to the probability density function (PDF) underlying technical parameter MAXF, i.e. maximum force. Histogram 300 may be generated using test setup device 200, see FIG. 2.

Figure 4:
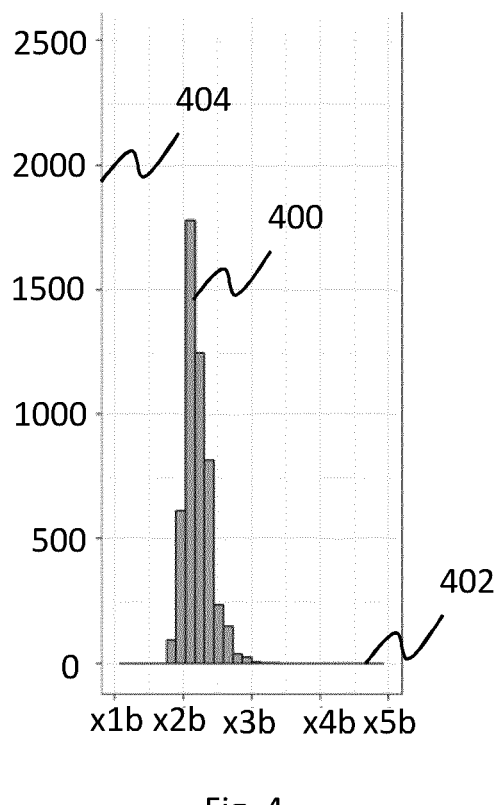

FIG. 4 illustrates a histogram 400 for the maximum torque MAXTRQ for dialing a dose using a pen injector. The maximum force MAXTRQ may be the relevant technical parameter mentioned in the first part of this document and mentioned in the claims as well. Histogram 400 is shown within a Cartesian coordinate system comprising a horizontal x-axis 402 and a vertical y-axis 404. The x-axis 402 represents maximum torque MAXTRQ data values, especially within the range of x1b Nm (Newton meter) to x5b Nm. The y-axis 404 represents the count, i.e. the number of devices falling within one of the classes of the histogram 400, for instance within the range of 0 to 2500.

In the example that is shown in FIG. 4, about 10 classes of same width are defined, some of them are empty, i.e. no tested device felt within these classes. The number of tested devices raises steeply on the left side of histogram 400 from 100 devices in a first filled class up to about 1800 devices in a center class. On the right side of histogram 400 the number of tested devices falls moderately if compared with the raising side from about 1250 devices to zero devices within class 10 of histogram 400.

Thus, histogram 400 has also an asymmetry with regard to an axis (not shown) forming the center of the class with the most tested devices, e.g. the center class. Histogram 400 corresponds to the probability density function (PDF) underlying technical parameter MAXTORQ, i.e. maximum torque.

Figure 5:
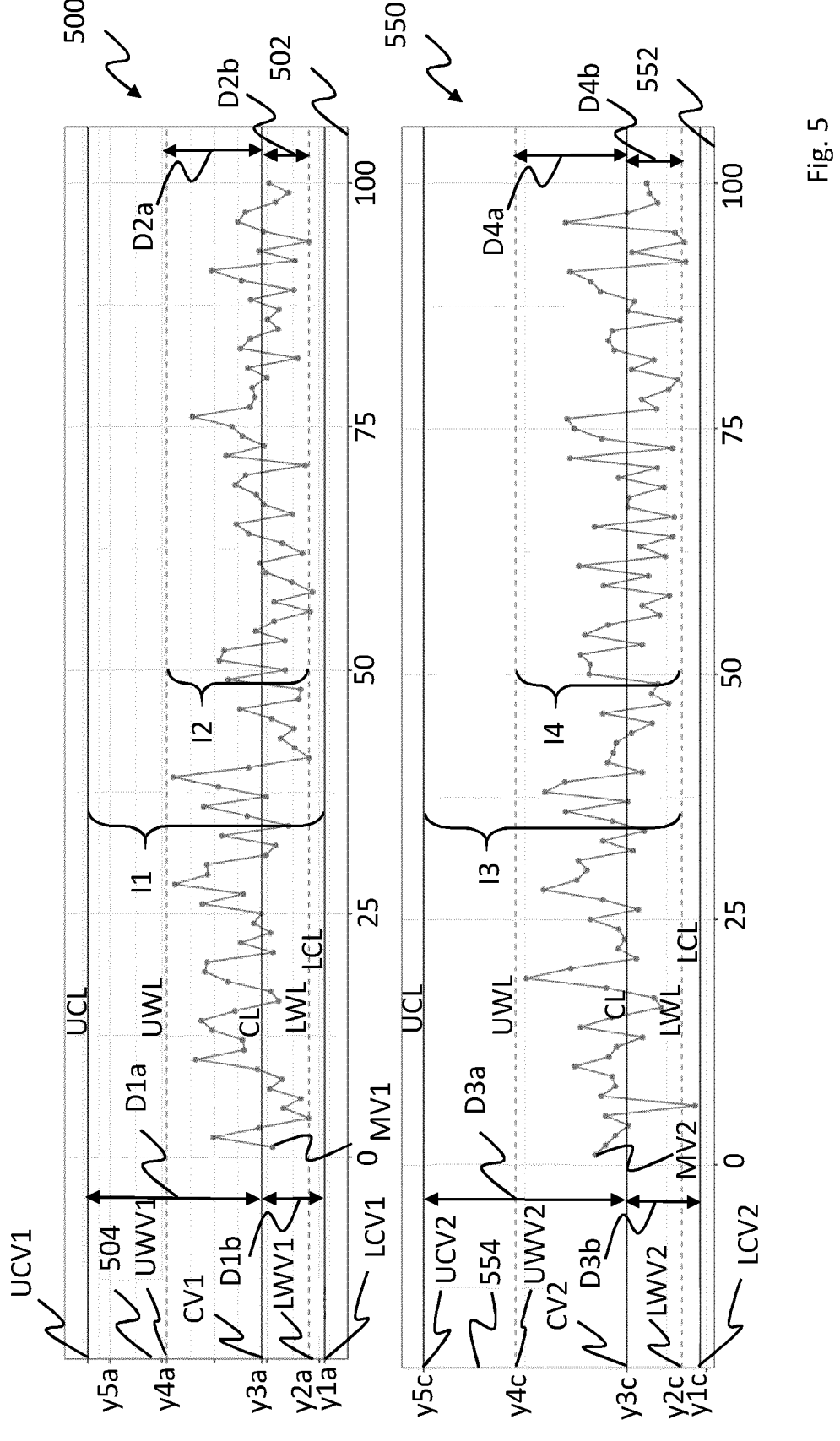

FIG. 5 illustrates an asymmetric $\bar{x}$ (mean) control chart 500 and an asymmetric s control chart 550. Control chart 500 is shown within a Cartesian coordinate system comprising a horizontal x-axis 502 and a vertical y-axis 504. The x-axis 502 represents the sample number, for instance in the range of number 0 (zero) to number 100. The y-axis 504 represents the mean value x̄ of a force MAXF in N (Newton) for instance in the range of about y1a N to y5a N. There are the following horizontal lines within control chart 500 from top to bottom:

An upper control limit UCL, e.g. at upper control value UCV1 for instance at y5a N, An upper warning limit UWL (optional), e.g. at upper warning value UWV1 for instance at y4a N, A center line CL, e.g. at center value CV1 for instance at y3a N, A lower warning limit LWL (optional), e.g. at lower warning value LWV1 for instance at y2a N, and A lower control limit LCL, e.g. lower control value LCV1 for instance at y1a N.

Control chart 500 may be based on histogram 300 according to FIG. 3. The USL of FIG. 3 may be above the UCL illustrated in the upper part of FIG. 5, i.e. control chart 500. The UCL is calculated based on reference data, i.e. the same data which is used to generate the histogram of FIG. 3.

The following distances are shown in FIG. 5, control chart 500:

A distance D1a between upper control limit UCL and center line CL, i.e. y5a minus y3a, A distance D1b between center line CL and lower control limit LCL, A distance D2a between upper warning limit UWL and center line CL, and A distance D2b center line CL and lower warning limit LWL.

The following intervals are shown in FIG. 5, control chart 500:

An interval 11 between upper control value UCV1, i.e. y5a N, and lower control value LCV1, i.e. y1a N, and An interval 12 between upper warning value UWV1, i.e. y4a N, and lower warning value LWV1, i.e. y2a N.

Distance D1a may be at least twice as long as distance D1b. This may be due to the asymmetry of histogram 300 or of a corresponding histogram or PDF. Distance D2a may be at least twice as long as distance D2b.

A first measured value MV1 of a sample 1 has a value slightly below y3a N. The one hundred measured values that are illustrated in FIG. 5, control chart 500 are connected by straight lines in order to ease visualizing the measured values MV1 etc.

Control chart 550 is a standard deviation s control chart 550 based on a Cartesian coordinate system comprising a horizontal x-axis 552 and a vertical y-axis 554. The x-axis 552 represents a sample number in the range of number zero to number 100. The y-axis 554 represents the deviation s of the force MAXF in N and in the range of about y1c N to y5c N. The samples that are relevant for control chart 550 may be the same samples that are relevant for control chart 500. There are the following horizontal lines within control chart 550 from top to bottom:

An upper control limit UCL, e.g. upper control value UCV2 for instance at y5c N, An upper warning limit UWL (optional), e.g. upper warning value UWV2 for instance at y4c N, A center line CL, e.g. center value CV2 for instance at y3c N, A lower warning limit LWL (optional), e.g. lower warning value LWV2 for instance at y2c N, and A lower control limit LCL, e.g. lower control value LCV2 for instance at y1c N.

The following distances are shown in FIG. 5, control chart 500:

A distance D3a between upper control limit UCL and center line CL, i.e. y5c minus y3c, A distance D3b between center line CL and lower control limit LCL, A distance D4a between upper warning limit UWL and center line CL, and A distance D4b center line CL and lower warning limit LWL, i.e. y3c minus y1c.

The following intervals are shown in FIG. 5, control chart 550:

An interval 13 between upper control value UCV2, i.e. y5c N, and lower control value LCV2, i.e. y1c N, and An interval 14 between upper warning value UWV2, y4c N, and lower warning value LWV2, i.e. y2c N.

Distance D3a may be at least twice as long as distance D3b. Distance D4a may be at least twice as long as distance D4b.

A second measured value MV2 of sample 1 has a value of about 1.5 N. The one hundred measured values that are illustrated in FIG. 5, control chart 550 are connected by straight lines in order to ease visualizing the measured values MV2, etc. Both measured values MV1 and MV2 belong to sample number 1.

Figure 6:
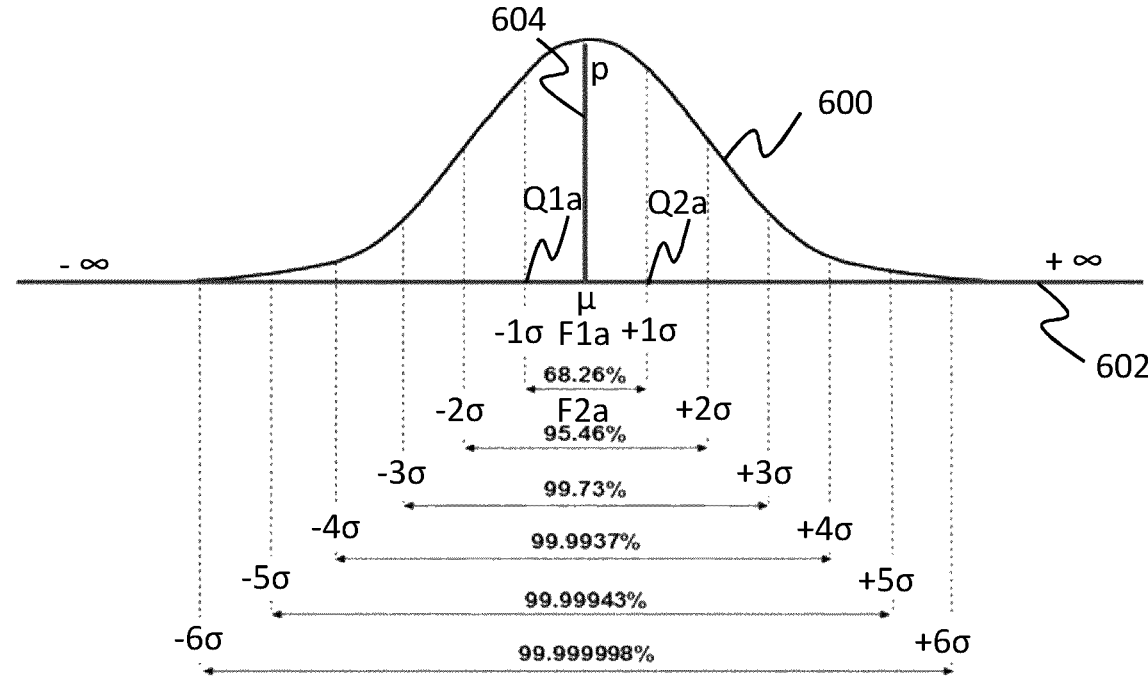

FIG. 6 illustrates a symmetric density function 600 and symmetric quantile values Q1a and Q2b. FIG. 6 is only illustrated for comparison reasons, i.e. for comparison with FIG. 7. Symmetric distribution 600 is shown within a Cartesian coordinate system comprising a horizontal x-axis 602 and a vertical y-axis 604. The x-axis 602 represents values of a technical parameter in the range of minus infinity to plus infinity in arbitrary units AU or without a unit. The y-axis 604 represents the probability p in the range from 0 to 1. The density function 600 is for instance the density function of the normal distribution. Density function 600 may also be named as probability density function PDF. The curve that describes density function 600 is bell shaped.

Quantile Q1a corresponds to quantile Q(16), i.e. 16 percent of all values are located on the left of Q(16). It may be said that the quantile has a quantile level L or an order. Thus, the quantile may be referred to more generally as Q(L), for instance Q(16) indicating a level L of 16 percent. Quantile Q2a corresponds to quantile Q(84). An area F1a below a curve that forms density function 600 and between quantiles Q1a and Q2a indicates an area having an area content of 68 percent of the overall area below this curve, i.e. 84 percent minus 16 percent. This represents the fact that about 68 percent of the values generated by a statistical process represented by density function 600 have a value between quantile Q1a and quantile Q2a. Quantile Q1a is the minus 1 sigma quantile and quantile Q2a is the plus 1 sigma quantile. The definition of 1 sigma is exactly chosen such that about 68 percent of the area is included in the range from minus 1 sigma to plus 1 sigma. It is possible to calculate the borders of the relevant percent ranges by simple arithmetic. For instance, for the 1 sigma range it is known that the difference of the percent values of the quantiles has to be 68 percent. Thus, the lower border may be calculated by subtracting this percent value of 68 percent from 100 percent resulting in 32 percent. Only one half of this value may be relevant for the lower percent range, i.e. 16 percent for Q1a. If the quantile Q2a is calculated a value of minus 1 sigma is got in the example. The upper percent value may be calculated by adding the relevant percent range to the lower percent value giving 16 percent plus 68 percent in the example, i.e. 84 percent for quantile Q2a. If the quantile Q2a is calculated a value of plus 1 sigma is got in the example.

The same calculation may be made for the other sigma ranges. The plus/minus 2 sigma range is especially relevant for production control because it indicated about 95.5 percent.

An area F2a covers 95.5 percent of the overall area below the curve that represents probability density function 600.

Figure 7:
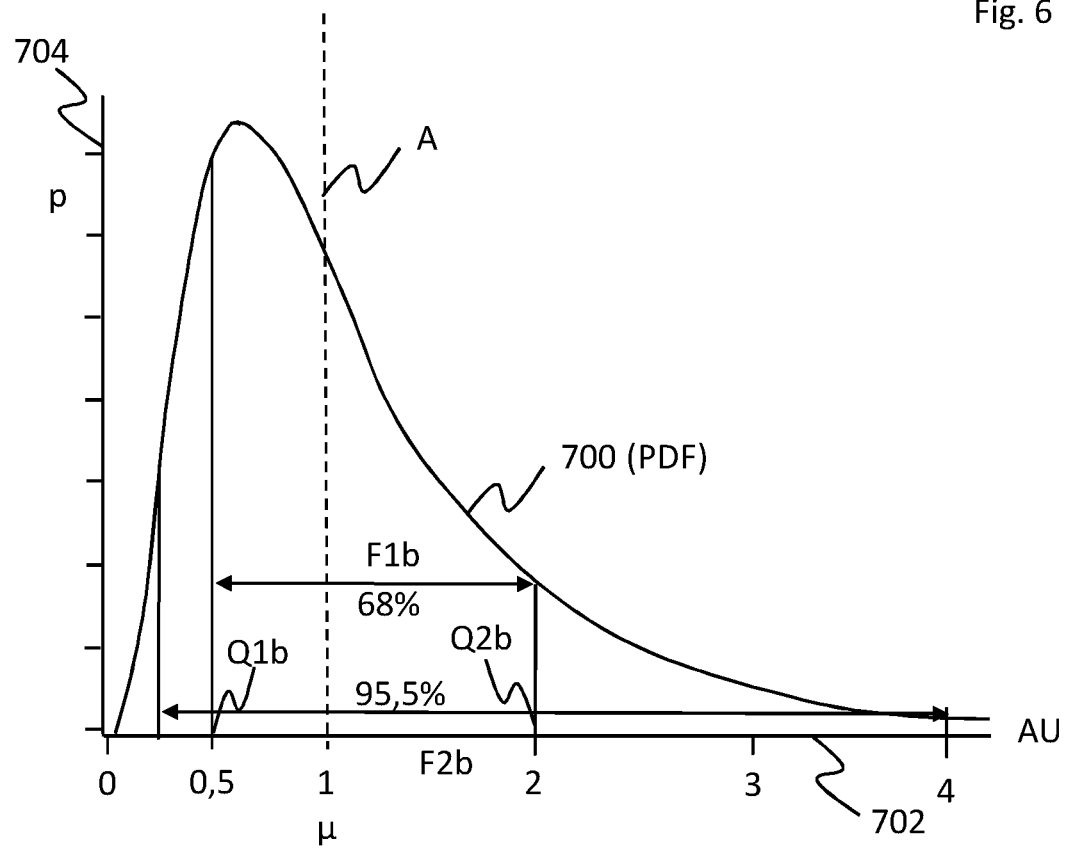

FIG. 7 illustrates an asymmetric density function 700 and asymmetric quantile values Q1b and Q2b. Asymmetric density function 700 is for instance one of the asymmetric distributions mentioned above. Density function 700 is a probability density function PDF. Asymmetric density function 700 is shown within a Cartesian coordinate system comprising a horizontal x-axis 702 and a vertical y-axis 704. The x-axis 702 represents values of a technical parameter in the range of 0 (zero) to plus infinity (only a range to about 4 is shown) having arbitrary units or no unit at all. The y-axis 704 represents the probability p for instance in the range from 0 to 1. The curve that represents density function 700 has a steep raising portion at the first part and then a longer falling portion compared to the length of the raising portion. An axis A is located at the mean value p and is parallel to the y-axis 704. If the axis A is used as a geometrical mirror axis it is apparent, that density function 700 is asymmetric because the maximum is left of (mirror) axis A and because the part that is left of (mirror) axis A is much shorter than the part of the curve or density function 700 that is right of the axis A.

Although the probability density function 700 is asymmetric compared to symmetrical probability density function 600. The quantiles are calculated by using the corresponding quantile function for the underlying distribution. To obtain the warning and control limits the percentages are used as for the symmetric distribution, see FIG. 6.

Quantile Q1b corresponds to quantile Q(16), i.e. 16 percent of all values are located on the left of Q(16). Quantile Q2b corresponds to quantile Q(84). An area F1b below a curve that forms density function 700 and between quantiles Q1b and Q2b indicates an area having an area content of 68 percent of the overall area below this curve. This represents the fact that about 68 percent of the values generated by a statistical process represented by density function 700 have a value between quantile Q1b and quantile Q2b. Quantile Q1b is the minus 1 sigma quantile and quantile Q2b is the plus 1 sigma quantile. The definition of 1 sigma is also for an asymmetric distribution exactly chosen such that about 68 percent of the area is included in the range from minus 1 sigma to plus 1 sigma. It is possible to calculate the borders of the relevant percent ranges by simple arithmetic. For instance, for the 1 sigma range it is known that the difference of the percent values of the quantiles has to be 68 percent. Thus, the lower percent border may be calculated by subtracting this percent value from 100 percent resulting in 32 percent. Independent of the asymmetry of the density function 600 half of this value is relevant for the lower range, i.e. 16 percent. The upper percent border may be calculated by adding the relevant range to the lower percent border giving 16 percent plus 68 percent in the example, i.e. 84 percent for quantile Q2b. The same applies for instance to the plus/minus 2 sigma quantile range or to other quantile ranges, e.g. plus/minus 3 sigma, etc.

Control limits values may be calculated for instance for:
0.00135 quantile: −3σ (sigma),
0.99865 quantile: +3σ (sigma), Optional warning limits if needed may be calculated for:
0.0227 quantile: −2σ (sigma),
0.99865 quantile: +2σ (sigma).

It may be possible to calculate the CDF analytically based on a PDF that is given in closed form. In a second step the inverse function of the CDF may be calculated which may allow a direct calculation of the quantiles.

Alternatively, numerical methods may be used to determine the quantiles for an arbitrary asymmetric function. Monte Carlo simulation may be used it nothing else works.

Figure 8:
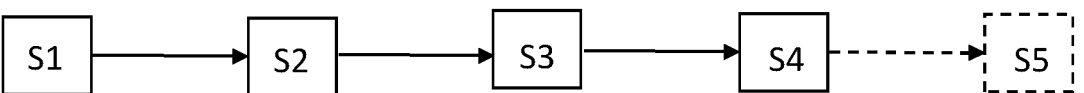

FIG. 8 illustrates a method for generating an asymmetric control chart, for instance control chart 500 or 550, see FIG. 5. The following steps may be performed in the sequence as listed below:

Step S1) Analyze historic data for a technical parameter, see for instance histogram 300 and 400 as illustrated in FIG. 3 and FIG. 4.

Step S2) Identify the underlying distribution. Statistical tests may be performed in order to verify the underlying distribution based on the data retrieved in step S1. Alternatively, more empirical approaches may be chosen, i.e. using a distribution type which gives good results during the production. It may be also possible to fit a curve to the histogram and to perform 30 numerical calculations for the quantiles based on the function that has been found for the curve. PDF and or CDF and/or characteristic parameters thereof of the estimated distributions may be calculated as well.

Step S3) Calculate control limits using a quantile function, especially an asymmetric quantile 35 function. Alternatively, numerical methods may be used. Thus, it is possible to calculate a table for all possible quantile levels and to use this table for the calculation of the quantiles. An asymmetric PDF and/or an asymmetric CDF may be used for this. Further alternatively, it is possible to use other mathematical methods to find the value for a quantile of a predetermined level L, for instance using iterative numerical methods or iterative graphical methods. The PDF and/or CDF and/or the parameters thereof may be used for the calculation.

Step S4) Create a control chart, see for instance FIG. 5, control chart 500 or 550. The following lines may be inserted into the control chart, e.g. 500 or 550 at the locations which are given by the quantile values calculated or determined in step S3:

An upper control limit UCL,
An upper warning limit UWL (optional),
A center line CL,
A lower warning limit LWL (optional), and
A lower control limit LCL.

The control chart 500 or 550 may be an electronic control chart that is based on data which is stored in an electronic memory, e.g. RAM (Random Access Memory, ROM (Read Only Memory), PROM (Programmable ROM), EPROM (erasable PROM), EEPROM (electrically EPROM), Flash EEPROM etc. The electronic control chart may be displayed on a monitor, touchscreen, etc. Measured values MV1, MV2 etc. may be inserted using a keyboard or a graphical input device, e.g. computer mouse, touchpad, touchscreen or electronic pen.

Alternatively, the control chart, e.g. 500 or 550 may be generated electronically and then printed out. In this case the measured values are inserted using a pen or pencil.

As a further alternative, it is possible to create the control chart, e.g. 500 or 550 on paper using a ruler and pen or pencil. Graph paper (millimeter paper) may be used to enable exact placing of the lines mentioned above, e.g. UCL and LCL and exact placing of the symbols for the measured values.

The resulting control chart, for instance 500 or 550 is:

Immediately usable for control of production,

Easy to explain to regulatory institutions,

Easy to create using common statistical software, spreadsheet program (for instance EXCEL) or electronic tabulator or pen and paper, The results of controlling the production are more exactly, and No transformation to normal distribution may be necessary for non-normal distributions.

Further advantages of the proposed methods are:

Control space on control chart, e.g. 500 or 550 is used completely or as much as possible, i.e. area between line for UCL and LCL and/or area between line UWL and LWL, and "Tight" or tighter positioning of at least one of the control limits and/or warning limits is possible because of the consideration of asymmetry, i.e. one side of the density function PDF of the distribution or of the cumulative distribution function CDF of the distribution is shorter than the other side whereby the center is for instance the mean value.

In an optional step S5 the generated control chart may be used for on-line monitoring of a production process, for instance a production process of drug delivery device 100 and/or a device that has been tested in test setup device 200. During usage of the control chart, e.g. 500 or 550 measured or detected values MV1, MV2 etc. are inserted into the control chart 500, 550 electronically or manually by using paper, pen and pencil. In the case of an electronic control chart the points that indicate the detected values MV1, MV2 may be connected automatically by a computer. The measured values may be stored electronically and may be used for later evaluation and analysis of the production process.

In the case of a paper control chart a ruler may be used to connect the detected values.

Figure 9:
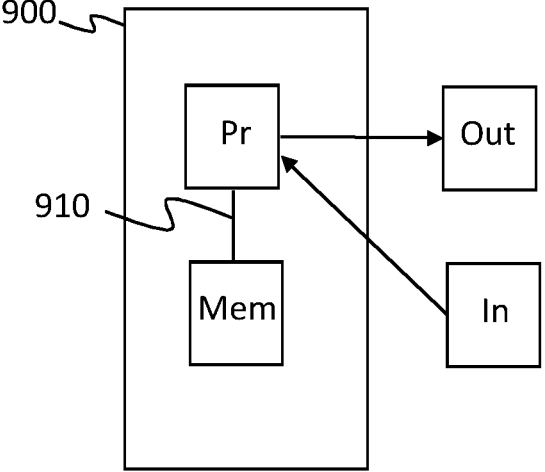

FIG. 9 illustrates a calculation device 900 that may perform the method steps S1 to S4 or even S5 which are shown in FIG. 8 or one, two or three of the method steps S1 to S4.

Calculating device 900 may comprise:

a processor (Pr) configured to execute instructions, especially for performing the disclosed calculations, a memory (Mem) that is configured to store the instructions and to store data that is used or generated during the execution of the instructions, for instance of quantiles, an optional input device (In), for instance a keyboard or a data receiving unit (e.g. via internet or intranet), that is configured to input data that will be stored in the memory (Mem), especially to enter detected values or measured values of a technical parameter, e.g. maximum force MAXF or maximum torque MAXTRQ as mentioned above, an optional output device (Out), for instance a display device or a data sending unit (e.g. via internet or intranet), that is configured to output data that is generated during the execution of the instructions, especially results of a comparison with an asymmetric interval or a control chart, e.g. 500 or 550, see FIG. 5, and a computer program product that calculates quantiles for an asymmetric PDF and/or for an asymmetric CDF.

There may be a connection/bus 910 between processor Pr and memory Mem. Further units of calculation unit 900 are not shown but are known to the person skilled in the art, for instance a power supply unit, an optional internet connection, etc. Alternatively, a server solution may be used that uses calculation power and/or memory space available on the internet supplied by other service providers or on an intranet of a company.

In another embodiment no control chart is generated but an upper and a lower value are used as part of an asymmetric interval as mentioned in the first part of the description, see also intervals 11 to 14 mentioned for FIG. 5. In this case some or all of the values mentioned for FIG. 5, control chart 500 may be relevant, e.g. upper control value UCV1 and/or upper warning value UWV1 and/or center value CV1 and/or lower warning value LWV1 and/or lower control value LCV1. Alternatively or cumulative, the values mentioned for FIG. 5, control chart 500 may be relevant, e.g. upper control value UCV2 and/or upper warning value UWV2 and/or center value CV2 and/or lower warning value LWV2 and/or lower control value LCV2.

In a further embodiment a physical parameter or technical parameter of the production process itself is compared to the asymmetric interval and/or to the upper line(s) and/or lower line(s) of an asymmetric control chart.

Examples of distributions which may be used are:

A) The generalized extreme value distribution comprises the Gumbel distribution (Fisher-Tippett distribution), the Fréchet distribution and the Weibull distribution. The PDF (probability density function) and CDF (cumulative distribution function) are known in closed form. Furthermore, the CDF is invertible in closed form. Thus, the quantiles may be calculated using a formula.

B) The smallest extreme value family of distributions is made up of three distributions: (negative) Weibull, negative Fréchet and smallest extreme value. The same or similar distributions are used that are mentioned in group A) or C). Thus, the quantile may be calculated as mentioned in the other groups A) and C).

C) Generalized gamma distribution which includes the exponential distribution, the gamma distribution and the Weibull distribution. The log-normal distribution is a limiting distribution of the generalized gamma distribution. The cumulative distribution function CDF is known for the generalized gamma distribution in analytical form. The quantile function can be found by noting that $F(x; a, d, p) = G((x/a)^p)$ where G is the cumulative distribution function of the gamma distribution with parameters $\alpha = d/p$ and $\beta = 1$. The quantile function is then given by inverting F using known relations about inverse of composite functions.

D) Other distributions which may be used are: Rossi-distribution, Rayleigh-distribution, etc.

More Specific Examples I to IV

I. Smallest Extreme Value Distribution:

$$f_{\sigma,\mu}(x) = \frac{1}{\sigma} \exp\left(\frac{x-\mu}{\sigma}\right) * \exp\left\{-\exp\left(\frac{x-\mu}{\sigma}\right)\right\}, \ (-\infty < x < \infty) \quad \text{(F1)}$$

wherein $\sigma$ is the scale parameter, $\mu$ is the location parameter of the extreme value distribution and x is the variable under test. This function is similar to the Gumbel distribution except of the minus and plus signs. Therefore, a similar calculation of quantiles may be applied as is mentioned below for the Gumbel distribution, i.e. see section III. "Exp" stands for the exponential function.

II. Weibull Distribution $$f_{\beta,\delta}(x) = \frac{\beta}{\delta}\left(\frac{x}{\delta}\right)^{\beta-1} * e^{-\left(\frac{x}{\delta}\right)^{\beta}} \tag{F2}$$

wherein $\beta$ is the form parameter or the Weibull module and $\delta=1/\lambda$ is the scale parameter and x is the variable under test. For the calculation of the quantile see for instance generalized extreme value distribution or generalized gamma distribution as mentioned above in group A) and in group C).

III. Gumbel Distribution:

$$h_{b,a}(x) = \frac{1}{b}\exp\left(-\frac{x-\mu}{b}\right) * \exp\left\{-\exp\left(-\frac{x-a}{b}\right)\right\}, \; (-\infty < x < \infty) \tag{F3}$$

wherein b is the form parameter is the scale parameter, a is the location parameter and x is the variable under test.

The cumulative distribution function H is the integral of h. H is for maxima:

$$H(x) = \exp\left(-\exp\left(-\frac{x-a}{b}\right)\right) \tag{F4}$$

The quantile function $H^{-1}$ is the inverse of H:

$$x = a - b \; \ln(-\ln(H)) \tag{F5}$$

"ln" stands for the function of the natural logarithm.

The technical parameter may be one of the following parameters of a drug delivery device: a) dose accuracy, b) dial torque, c) dispense force, d) cap attachment force, e) cap removal force, f) needle shield removal force, g) injection time, h) activation force, i) blocking distance of a needle cover, j) needle extension, k) expelled volume or l) assembly force. Some of the force parameters may be related to a mechanical energy storage device within the medical device, for instance to a mechanical spring. Examples for mechanical springs that may be used are helical springs, spiral springs and/or leaf springs. The springs may be tension, compression springs or torsion springs.

At least one of a value LWV1, LWV2, LCV1, LCV2 which indicates the beginning of the interval (LWL or LCL), a value UWV1, UWV2, UCV1, UCV2 which indicates the end of the interval (UWL or UCL) and a value (CV1, CV2, CL) which is used as the characteristic value of the distribution may be adjusted depending on the monitoring of the production process, i.e. based on an asymmetric control chart and/or based on a comparison made for an asymmetric interval.

Although embodiments of the present disclosure and their advantages have been described in detail, it should be understood that various changes, substitutions and alterations can be made therein without departing from the spirit and scope of the disclosure as defined by the appended claims. For example, it will be readily understood by those skilled in the art that many of the features, functions, processes and methods described herein may be varied while remaining within the scope of the present disclosure. Moreover, the scope of the present application is not intended to be limited to the particular embodiments of the system, process, manufacture, method or steps described in the present disclosure. As one of ordinary skill in the art will readily appreciate from the disclosure of the present disclosure, systems, processes, manufacture, methods or steps presently existing or to be developed later that perform substantially the same function or achieve substantially the same result as the corresponding embodiments described herein may be utilized according to the present disclosure. Accordingly, the appended claims are intended to include within their scope such systems, processes, methods or steps. The embodiments mentioned in the first part of the description may be combined with each other. The embodiments of the description of FIGS. 1 to 9 may also be combined with each other. Further, it is possible to combine embodiments mentioned in the first part of the description with examples of the second part of the description which relates to FIGS. 1 to 9.

The invention claimed is:

1. A method executable by a computing system, the method comprising:

receiving data regarding a technical parameter whose values have an asymmetric distribution, the technical parameter being a parameter of a production process or a parameter of units produced in the production process;

determining an asymmetric interval in the asymmetric distribution, wherein the asymmetric interval is defined by an upper value for an upper limit of the technical parameter and a lower value for a lower limit of the technical parameter, the asymmetric interval being asymmetric with regard to a characteristic value of the asymmetric distribution;

comparing at least one value of the technical parameter with the asymmetric interval to obtain at least one respective comparison value; and taking a preventative action based on the at least one respective comparison value, the preventative action comprising at least one of generating a warning signal or stopping the production process, wherein the preventative action comprising the warning signal is an action according to an out-of-control action plan which requires to adjust the production process, wherein at least one of the upper value and the lower value is determined by:

receiving historical or simulated data for the technical parameter;

identifying an asymmetric probability density function or an asymmetric cumulative distribution function for the received historic or simulated data;

calculating at least one quantile for the historic or simulated data using at least one of the asymmetric probability density function and the asymmetric cumulative distribution function for the historic or simulated data; and determining the at least one of the upper value and the lower value based on the at least one quantile.

2. The method according to claim 1, wherein the asymmetric distribution is an asymmetric probability density function or an asymmetric cumulative distribution function, and wherein the method further comprises:

determining the upper value for the upper limit of the technical parameter; and determining the lower value for the lower limit of the technical parameter, wherein the asymmetric interval comprises differences of the upper value and the lower value with respect to the characteristic value such that a first difference of the upper value and the characteristic value is different from a second difference of the characteristic value and the lower value.

3. The method according to claim 2, wherein the asymmetric interval is a first asymmetric interval, the respective comparison value is a first comparison value, and the method further comprises:

identifying a second asymmetric interval in the asymmetric distribution by
determining an upper warning value and a lower warning value for the technical parameter, and
setting the second asymmetric interval as a difference between at least two of the upper value, the lower value, the upper warning value, and the lower warning value such that the second asymmetric interval is asymmetric with respect to the characteristic value; and
comparing the at least one value of the technical parameter with the second asymmetric interval to obtain at least one second respective comparison value,
wherein the preventative action is taken based on the second comparison value.

4. The method according to claim 1, further comprising receiving historic or simulated data for the technical parameter,
wherein setting the characteristic value comprises calculating the characteristic value based on a location measure or a center of a dispersion measure of at least one of the asymmetric probability density function and the asymmetric cumulative distribution function of the generated historic or simulated data.

5. The method according to claim 4, wherein the characteristic value is set as the location measure or the center of the dispersion measure.

6. The method according to claim 1, further comprising:
generating an electronic control chart in electronic form for the technical parameter based on the asymmetric probability density function of the generated historic or simulated data;
determining at least one of a position of an upper line indicating the upper limit and a position of a lower line indicating the lower limit based on the at least one quantile;
placing an intermediate line in the electronic control chart at a center value indicating a center of a location measure or a center of a dispersion measure of the asymmetric probability density function, and placing at least one of the upper line and the lower line in parallel to the intermediate line at the determined position or at the determined positions;
receiving values of the technical parameter for samples of units which are produced by the production process or values of the technical parameter for the production process;
inserting the received values into the electronic control chart; and
using the electronic control chart and the inserted values for monitoring and/or controlling the production process.

7. The method according to claim 1, wherein calculating the at least one quantile comprises:
calculating analytically the asymmetric cumulative distribution function by integrating the asymmetric probability density function of the generated historic or simulated data;
calculating analytically an inverse function of the asymmetric cumulative distribution function; and
calculating the quantile by determining a function value of the inverse function for a specified level of the quantile.

8. The method according to claim 1, wherein calculating the at least one quantile comprises:
numerically integrating the asymmetric probability density function of the generated historic or simulated data; and
using at least one result of the numerical integration to determine the quantile depending on a level of the quantile.

9. The method according to claim 1, wherein the production process is a production process for production of medical devices, or parts of medical devices or of assemblies that are parts of medical devices.

10. The method according to claim 9, wherein the technical parameter is selected from one of the following parameters of a drug delivery device:
dose accuracy of the multi dose pen, dial torque of the multi dose pen, dispense force of the autoinjector or of the multi dose pen, cap attachment force of a cap of the autoinjector or of the multi dose pen, cap removal force of the cap of the autoinjector or of the multi dose pen, needle shield removal force of the cap of the autoinjector or of the multi dose pen, injection time of the autoinjector or of the multi dose pen, activation force of the autoinjector, blocking distance of a needle cover of the autoinjector, needle extension of the autoinjector, expelled volume of the autoinjector or of the multi dose pen, or assembly force of the autoinjector or of the multi dose pen; and
wherein the parameter of the respective unit is measured by a test unit.

11. The method according to claim 1, wherein the asymmetric distribution is one of:
a generalized extreme value distribution, a generalized gamma distribution, a smallest extreme value family, a Gumbel distribution, a Fréchet distribution, a Weibull distribution, an exponential distribution, a gamma distribution, a log-normal distribution, a Rossi distribution, or a Rayleigh distribution.

12. The method according to claim 1, further comprising controlling the production process by using the asymmetric interval for:
on-line process-monitoring of the production process, or
triggering actions of an out-of-control action plan for the production process, or estimating parameters of the units or of the production process, or
providing information that is useful for improving the units or the production process, or reducing or eliminating variability of at least one of the units and of the production process.

13. The method according to claim 1, further comprising adjusting at least one of a value that indicates a beginning of the asymmetric interval, a value that indicates an end of the asymmetric interval, or the characteristic value based on the at least one respective comparison value.

14. The method according to claim 1, wherein a test device is used for determining values of the units, wherein the test device comprises:
a mounting arrangement that allows movement of movable parts of the test device,
a motor that generates torque for the movement of the movable parts,
at least one clamp device to clamp the respective product of the sample group, a control device which controls the movement that is generated by the motor, a force sensor, and a measurement reporting device that is connected to the force sensor.

15. A method executable by a computing system, the method comprising:

receiving data regarding a technical parameter whose values have an asymmetric distribution, the technical parameter being a parameter of units produced in a production process;

determining an asymmetric interval in the asymmetric distribution, the asymmetric interval being asymmetric with regard to a characteristic value of the asymmetric distribution;

comparing at least one value of the technical parameter with the asymmetric interval to obtain at least one respective comparison value, wherein the at least one value of the technical parameter is generated by taking samples of the parameter of the units produced in the production process according to a sampling plan specifying a sample size and/or a sample time/time interval; and taking a preventative action based on the at least one respective comparison value, the preventative action comprising stopping the production process, wherein the asymmetric distribution is an asymmetric probability density function or an asymmetric cumulative distribution function, and wherein the method further comprises:

determining an upper value for an upper limit of the technical parameter; and determining a lower value for a lower limit of the technical parameter, wherein the asymmetric interval comprises differences of the upper value and the lower value with respect to the characteristic value such that a first difference of the upper value and the characteristic value is different from a second difference of the characteristic value and the lower value, wherein the upper value indicates an upper control value, wherein the lower value indicates a lower control value, wherein there is a first difference between the upper control value and the characteristic value, wherein there is a second difference between the characteristic value and the lower control value, wherein the second difference is at least 10 percent longer than the first difference or wherein the first difference is at least 10 percent longer than the second difference, and wherein the lower control value or both the upper and the lower control values are different from zero, wherein the units produced in the production process are autoinjectors or multi dose pens or parts thereof, wherein the units comprise at least one of:

a housing part, a piston rod arranged in the housing part, a driving mechanism for the piston rod, and a cap attached to the housing part or configured to be attached to the housing part.

16. A method executable by a computing system, the method comprising:

receiving data regarding a technical parameter whose values have an asymmetric distribution, the technical parameter being a parameter of a production process or a parameter of units produced in the production process;

determining an asymmetric interval in the asymmetric distribution, the asymmetric interval being asymmetric with regard to a characteristic value of the asymmetric distribution;

automatically comparing at least one value of the technical parameter with the asymmetric interval to obtain at least one respective comparison value, wherein the at least one value of the technical parameter is generated by taking samples of the parameter of the production process or of the parameter of the units produced in the production process according to a sampling plan specifying a sample size and/or a sample time/time interval; and taking a preventative action based on the at least one respective comparison value, the preventative action comprising at least one of generating automatically a warning signal or stopping the production process, wherein the preventative action is an action according to an out-of-control action plan, wherein the action according to an out-of-control action plan requires to adjust a technical parameter of the production process, wherein the asymmetric distribution is an asymmetric probability density function or an asymmetric cumulative distribution function, and wherein the method further comprises:

determining an upper value for an upper limit of the technical parameter; and determining a lower value for a lower limit of the technical parameter;

wherein the asymmetric interval comprises differences of the upper value and the lower value with respect to the characteristic value such that a first difference of the upper value and the characteristic value is different form a second difference of the characteristic value and the lower value, wherein the upper value indicates an upper warning value, wherein the lower value indicates a lower warning value, wherein there is a first warning difference between the upper warning value and the characteristic value, wherein there is a second warning difference between the characteristic value and the lower warning value, wherein the second warning difference is at least 10 percent longer than the first warning difference or wherein the first warning difference is at least 10 percent longer than the second warning difference, wherein the lower warning value or both warning values are different from zero, wherein the units produced in the production process are autoinjectors or multi dose pens or parts thereof, and wherein the units comprise at least one of:

a housing part, a piston rod arranged in the housing part, a driving mechanism for the piston rod, and a cap attached to the housing part or configured to be attached to the housing part.

* * * * *